(No Model.)
D. M. PFAUTZ.
SPRING MOTOR.
No. 296,707. Patented Apr. 8, 1884.
Fig. 1.
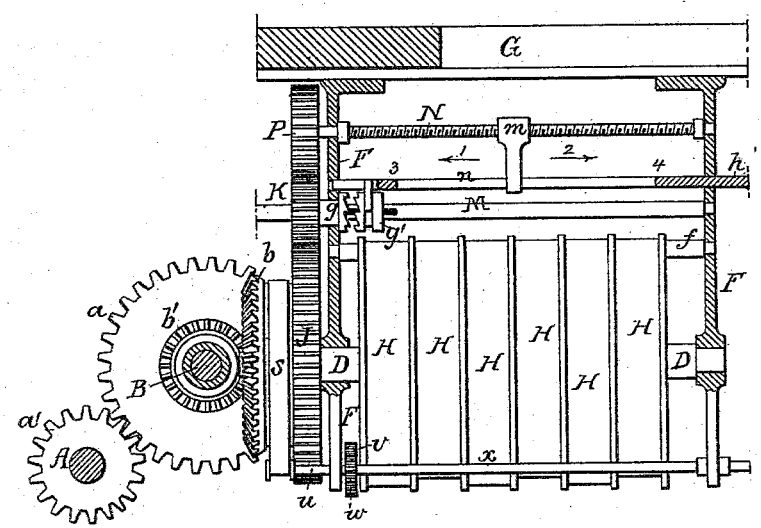
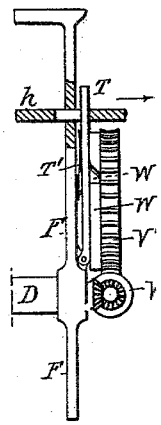
Fig. 5.
Fig. 2.
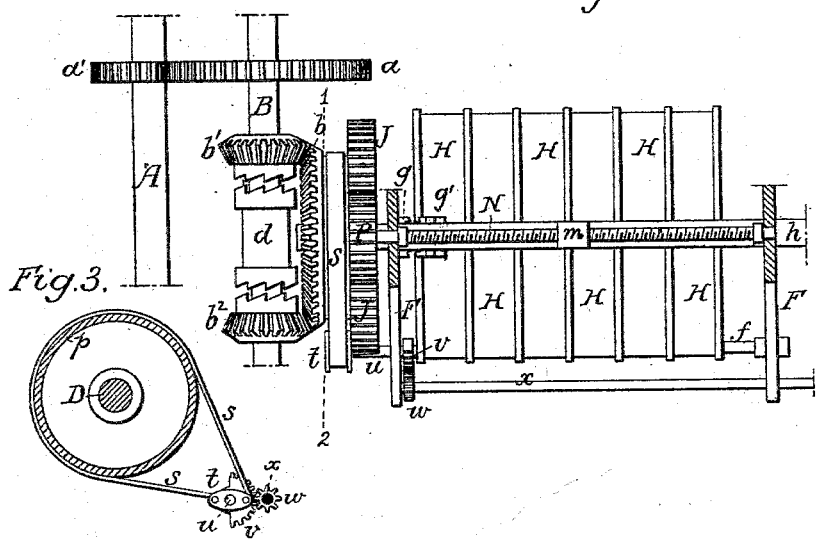
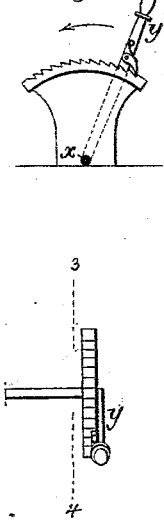
Fig. 4.
Fig. 3.
Witnesses
John E. Parker
James F. Tobin
Inventor
Daniel M. Pfautz
by his Attorneys
Howson & Sons

UNITED STATES PATENT OFFICE.

DANIEL M. PFAUTZ, OF PHILADELPHIA, PENNSYLVANIA, ASSIGNOR TO THE AUTOMATIC SPRING MOTOR CAR AND CARRIAGE COMPANY, OF CAMDEN, NEW JERSEY.

SPRING-MOTOR.

SPECIFICATION forming part of Letters Patent No. 296,707, dated April 8, 1884.

Application filed November 26, 1883. (No model.)

*To all whom it may concern:*

Be it known that I, DANIEL M. PFAUTZ, a citizen of the United States, and a resident of Philadelphia, Pennsylvania, have invented certain Improvements in Spring-Motors, of which the following is a specification.

My invention consists of certain improvements in the spring-motor for which Letters Patent No. 282,919 were granted to my assignees on the 7th day of August, 1883, one object of my present improvements being to automatically throw out of gear the winding mechanism connected with any set of springs, when said set of springs is fully wound up, without interfering with the winding up of the other sets, a further object being to provide a more effective device than that shown in the patent for locking the spring-shaft when the clutch connecting the same to the counter-shaft or axle is thrown out of gear.

In the accompanying drawings, Figure 1 is a side view, partly in section, of sufficient of the motor to illustrate my improvements; Fig. 2, a sectional plan view; Figs. 3 and 4, transverse sections on the lines 1 2 and 3 4, respectively, Fig. 2, showing the locking device and its operating mechanism; and Fig. 5, a view showing a modification of the clutch-operating device.

I have only shown in the drawings one set of springs and the winding and locking mechanism used in connection with the same; but it will be understood that each set of springs is, as in the patented motor, furnished with like mechanism.

A represents one of the axles of the vehicle, and B a counter-shaft geared thereto by a spur-wheel, $a$, and pinion $a'$, the counter-shaft being driven from the spring-shaft D by means of a bevel-wheel, $b$, gearing into pinions $b'$ $b^2$—one on one side and the other on the opposite side of the center of the spring-shaft—the shaft B having a duplex clutch, $d$, whereby it can be thrown into gear with either pinion $b'$ $b^2$, or out of gear with both, according as it is desired to turn the shaft forward or backward or to stop the same. The axle A may, if desired, be driven directly from the spring-shaft, as set forth in the patent. The shaft D turns in bearings in hangers F, bolted to the car-frame G, and to the said shaft D are secured the inner ends of a series of springs, H—six in the present instance—the outer ends of the springs being secured to a rod, $f$, carried by the hangers F.

To the shaft D is secured, so as to turn in both directions therewith, a spur-wheel, J, and into this wheel gears a pinion, K, on a shaft, M, which is free to turn in bearings in the hangers F, and is intended to be connected to any suitable winding-gear, each shaft M being common to a number of sets of springs. The pinion K forms part of one half, $g$, of a clutch-sleeve, which is free to turn on the shaft M, the other half, $g'$, of said sleeve being keyed to the shaft, but free to move longitudinally thereon, this half of the clutch being under the control of a bar, $h$, which is connected to a lever on the platform of the car, as described in the aforesaid patent, so that the pinion K can be readily clutched to the shaft M when it is desired to wind up the springs H, or released from said shaft when the springs are fully wound up. This mechanism is the same as that described in the patent; but in said patented device constant attention had to be paid during the winding operation to the indicators connected to the spring-shafts, so that each of said shafts could be thrown out of gear with the winding-shaft when its springs became fully wound, for it should be understood that when the vehicle reaches a winding-station some of the springs may be fully unwound and others only partly unwound, so that the latter will require less winding than the former. In my present device I render this attention unnecessary, and provide automatic mechanism for throwing the winding-shaft out of gear with the spring-shaft when the springs are wound up, the device as constructed being also available for throwing the clutch in gear when the springs are fully unwound.

The device comprises a screw-shaft, N, geared by a spur-wheel, P, to the pinion K of the winding-shaft M, and having a nut, $m$, a projection on which is adapted to a slot, $n$, in the clutch-shifting bar $h$. As the spring-shaft turns, this screw-shaft N is also caused to turn, owing to the gearing shown, and as the nut $m$ is prevented by its engagement with the bar $h$ from turning with said shaft N, it is caused to traverse the same longitudinally, moving in the direction of the arrow 1 as the springs are unwound, and in the direction of the arrow 2 as the springs are wound up. The thread of the screw-shaft N is such, and the nut $m$ is so set thereon in respect to the slot $n$ in the bar $h$, that when the spring is fully unwound the projection of the nut will come into contact with the bar at the end 3 of the slot and move the portion $g'$ of the clutch into engagement with the portion $g$, so as to throw the winding-shaft into gear with the spring-shaft, and when the springs H have been fully wound up, the projection of the nut striking the bar $h$ at the end 4 of the slot will move the portion $g'$ of the clutch away from the portion $g$, and thus throw the spring-shaft out of gear, the bar $h$ being held in this position by the nut until the springs H have been partially unwound, so that the bar $h$ cannot be moved by hand so as to throw the winding-clutch into gear until the springs H are in a condition to be further wound. If, when the winding operation commences, the springs H are only partially unwound, the bar $h$ is operated by hand, so as to throw the winding-clutch into gear, the nut $m$ occupying a position at some point between the ends of the slot $n$, and its movement prior to throwing the clutch out of gear being directly proportionate to the amount of wind which has to be imparted to the springs.

The nut $m$ may act upon lugs on the bar $h$, and may be prevented from turning by a separate bar, and the screw-shaft and nut may be used simply for throwing the winding-clutch out of gear when the springs are wound; or, if desired, other devices for this purpose may be substituted for said screw-shaft and nut. For instance, in Fig. 5 I have shown a modification of this feature of my invention, in which the shifting of the clutch is effected by means of a lever, T, connected to the bar $h$, hung to the bracket F, and acted on by a spring, T'.

On a short transverse shaft geared to the spring-shaft D is a worm, V, which actuates a worm-wheel, V', and on the latter is a flange, W, having a notch, W', which, when the springs are fully wound, is brought into line with the lever T and permits the operation of the latter by the spring T', so as to move the rod $h$ in the direction of the arrow and throw the winding-clutch out of gear, the edge of the notch W' being inclined, as shown, so as to force the lever from the notch as the worm-wheel turns backward on the reverse movement of the spring-shaft.

Secured to the bevel-wheel $b$ of the winding-shaft is a friction-drum, $p$, to which is adapted a brake-strap, $s$, the opposite ends of which are connected to the opposite arms of a lever, $t$, Fig. 3, secured to a rock-shaft, $u$, a toothed segment, $v$, on which gears into a pinion, $w$, on a shaft, $x$, adapted to bearings in the hangers F, and extending to the platform of the vehicle, where it is furnished with an operating-lever, $y$, and a suitable retaining device therefor, as shown in Figs. 3 and 4. By moving the lever $y$ in the direction of the arrow, Fig. 4, the lever $t$ will be actuated so as to pull upon both ends of the brake-strap $s$, and thus bind the same firmly to the drum $p$, thereby preventing any movement of the spring-shaft when the latter is thrown out of gear with the shaft B, the friction-brake being less abrupt in its action and less liable to cause injury to the parts than the direct locking device shown in the former patent.

I claim as my invention—

1. The combination of a spring-shaft, a winding-shaft, a clutching device whereby the two shafts can be thrown into and out of gear, and clutch-shifting mechanism, substantially as described, operating in unison with the spring-shaft, whereby the latter is thrown out of gear with the winding-shaft when the spring is wound up, as set forth.

2. The combination of the spring-shaft, the winding-shaft, a clutching device whereby the two shafts can be thrown into and out of gear, a screw-shaft, N, geared to the spring-shaft, and having a nut, $m$, and means, substantially as described, whereby the nut is caused to traverse the screw-shaft and actuate the clutch, as set forth.

3. The combination of the spring-shaft D, the winding-shaft M, the clutch $g$ $g'$, the slotted rod $h$, connected to the movable half of the clutch, the screw-shaft N, and the nut $m$ thereon, having a projection adapted to the slot of the bar $h$, as set forth.

4. The combination of the spring-shaft D, a counter-shaft or axle, B, and clutching mechanism whereby the two shafts may be thrown into and out of gear, with a friction-drum secured to said shaft D, and a brake-strap applied to said drum, whereby the shaft can be locked in position when thrown out of gear with the shaft B, as set forth.

5. The combination of the spring-shaft D, having a drum, $p$, the brake-strap $s$, adapted thereto, and the lever $t$, the opposite arms of of which are connected to the opposite ends of said brake-strap, as set forth.

In testimony whereof I have signed my name to this specification in the presence of two subscribing witnesses.

DANIEL M. PFAUTZ.

Witnesses:
JOHN M. CLAYTON,
HARRY SMITH.